June 10, 1941.   R. W. SCOTT ET AL   2,244,808
VALVE
Filed June 27, 1938
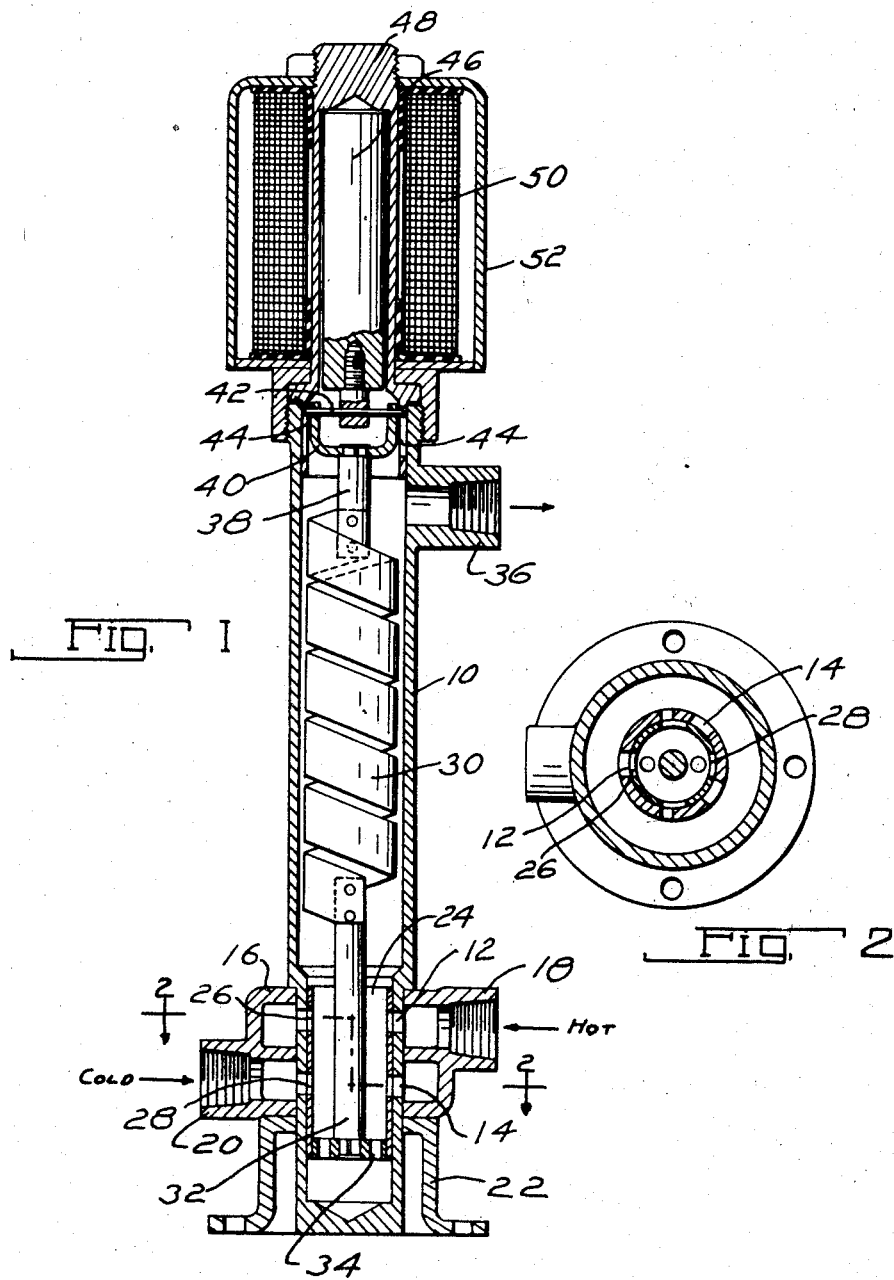

Patented June 10, 1941

2,244,808

UNITED STATES PATENT OFFICE 2,244,808

VALVE

Ray W. Scott and Andrew O. McCollum, Detroit, Mich., assignors to Bendix Home Appliances, Inc., South Bend, Ind., a corporation of Delaware Application June 27, 1938, Serial No. 215,985

5 Claims. (Cl. 236—12)

This invention relates to valves and more particularly to combined mixing and cut-off valves.

One of the objects of the invention is to provide a valve which automatically regulates the flow of fluids at different temperatures to provide a mixture at a predetermined temperature and which also serves to cut off the flow of fluid. Preferably the automatic control is effected by a thermostat responsive to the temperature of the mixed fluids.

Another object of the invention is to provide a combined mixing and cut-off valve in which a single valve element serves both to control the mixing and to cut off the flow. According to one desirable arrangement the valve element is rotated to effect one control and is shifted axially to effect the other.

Still another object of the invention is to provide a combined mixing and cut-off valve in which the mixing is controlled automatically by a thermostat and the cut-off is controlled electrically through a solenoid or the like. According to one feature of the invention the thermostat rotates a valve element to control the mixing and both the thermostat and the valve element are shifted axially by the solenoid to cut off and turn on the flow.

Other objects, advantages, and novel features of the invention will be apparent from the following description of the accompanying drawing, in which:

Figure 1 is a central section through a valve embodying the invention; and

Figure 2 is a section on the offset line 2—2 of Figure 1.

The valve illustrated is particularly adapted to control the admission of water to an automatic washing machine and serves both to shut off the water and to proportion the hot and cold water to provide a mixture at a desired predetermined temperature.

The valve comprises an elongated tubular body 10 formed adjacent one end with axially spaced series of hot and cold water inlet ports 12 and 14. A block 16 surrounds the body 10 and is formed with annular cavities registering respectively with the ports 12 and 14 and with inlet nipples 18 and 20. A base member 22 is secured on the end of the body and serves as a mounting therefor, the body 10 preferably being arranged with its axis vertical.

A tubular valve sleeve 24 is slidably and rotatably mounted in the body 10 and has spaced series of openings 26 and 28 adapted to register respectively with the ports 12 and 14. As best seen in Figure 2 the ports 12 and 14 and the openings 26 and 28 are arranged in staggered relationship so that when one set of ports is fully opened the other is fully closed. Normally each set of ports is partially open.

The valve sleeve 24 is controlled by a coiled thermostatic strip 30 of bimetal or the like connected at one end to the sleeve through a rod 32 and a spider 34. The strip 30 lies in the body 10 between the inlet ports and an outlet port 36 adjacent the upper end of the body. The upper end of the strip 30 is secured to a rod 38 carried by a member 40 loosely mounted in the body and held against rotation therein by a pin 42 having its ends slidable in slots or grooves 44. By this means the upper end of the strip is held against rotation but may be slid axially of the body.

The parts are held in the on or operating position shown in Figure 1 by a magnetizable core 46 of iron or the like connected to the pin 42 and slidable in an extension 48 of the valve body. A solenoid coil 50 is wound around the extension 48 and is enclosed in a suitable housing 52. Any desired automatic or manual switch, not shown, may be provided to control the coil 50.

In use the nipples 18 and 20 are connected to suitable sources of hot and cold water or other fluid and the outlet nipple 36 is connected to a device, such as a washing machine, to which mixed fluid is to be supplied. If the coil 50 is energized the core 46 will be raised to raise member 40, strip 30 and sleeve 24 to a position in which the openings 26 and 28 register with the ports 12 and 14 as shown in Figure 1. At this time water will flow through the body 10 and out the port 36, the water becoming thoroughly mixed in its passage through the body.

The strip 30 deflects in response to variations in temperature tending either to unwind or to wind up tighter depending on the direction of variation and turns the sleeve 24 to change the relative effective areas of the ports 12 and 14. In the particular example shown the strip unwinds in response to an increase in temperature to throttle the hot water ports 12 and open the cold water ports 14 to provide a cooler mixture. It will be understood that the strip 30 can be designed and adjusted to produce any desired temperature of the mixture.

When the flow of water is to be cut off entirely the coil 50 is de-energized, permitting the core 46, strip 30 and sleeve 24 to drop down under the influence of gravity. This moves the openings 26 and 28 out of register with the ports 12 and 14 and shuts off the flow of fluid into the valve body.

While one embodiment of the invention has been shown and described in detail it will be understood that numerous changes might be made therein and it is not intended to limit the scope of the invention to the exact form shown nor otherwise than by the terms of the appended claims.

What is claimed is:

1. A combined mixing and cut-off valve comprising a hollow valve body having spaced ports for inlet of fluids to be mixed and an outlet port for the mixed fluid, a valve member movably mounted in the body and having spaced portions to control said ports, thermostatic means in the body responsive to the temperature of the mixed fluids to move said valve in one direction to control the relative opening of the inlet ports and electrical means to move the thermostatic means and the valve member as a unit in a direction to close and open all of the inlet ports.

2. A combined mixing and cut-off valve comprising a hollow valve body having spaced ports for inlet of fluids to be mixed and an outlet port for the mixed fluid, a valve member slidably and rotatably mounted in the body and having spaced portions to control said ports, thermostatic means in the body responsive to the temperature of the mixed fluids to rotate said valve to control the relative opening of the inlet ports, and electrically operated means to slide the thermostatic means and the valve member bodily in a direction to close and open all of the inlet ports.

3. A combined mixing and cut-off valve comprising a tubular valve body having axially spaced inlet ports adjacent one end and an outlet port adjacent its other end, a tubular valve member slidably and rotatably mounted in said one end of the body and having axially spaced openings adapted to register with the inlet ports, a thermostat in the body connected to the tubular member to rotate it to vary the relative opening of the inlet ports, a magnetizable core connected to the thermostat, and a coil carried by the body around the core to shift the core, the thermostat and the tubular member as a unit axially of the body simultaneously to open and close all of the inlet ports.

4. A combined mixing and cut-off valve comprising a tubular valve body having axially spaced inlet ports adjacent one end and an outlet port adjacent its other end, a tubular valve member slidably and rotatably mounted in said one end of the body and having axially spaced openings adapted to register with the inlet ports, a thermostat in the body connected to the tubular member to rotate it to vary the relative opening of the inlet ports, a magnetizable core connected to the thermostat, and a coil carried by the body around the core to shift the core, the thermostat and the tubular member as a unit axially of the body simultaneously to open and close all of the inlet ports, said body being arranged vertically whereby the core, the thermostat and the tubular member move downwardly under the influence of gravity and said coil serving when energized to raise the core.

5. A combined mixing and cut-off valve comprising a tubular valve body having axially spaced inlet ports adjacent one end and an outlet port adjacent its other end, a tubular valve member slidably and rotatably mounted in said one end of the body and having axially spaced openings adapted to register with the inlet ports, a member slidably but non-rotatably mounted adjacent said other end of the body, a coiled thermostatic strip connected at one end to said last named member and at its other end to the valve member to rotate the valve member upon variations in temperature of the mixed fluid thereby to vary the relative opening of the inlet ports, a magnetizable core connected to said last named member, and a coil carried by the body around said core to shift the core axially thereby to open and close all of the inlet ports simultaneously.

RAY W. SCOTT.
ANDREW O. McCOLLUM.